Dec. 30, 1924.

H. P. SLEEPER

TEMPERATURE INDICATOR

Filed Nov. 30, 1920

1,520,915

WITNESSES:

INVENTOR
Harvey P. Sleeper
BY
ATTORNEY

Patented Dec. 30, 1924.

1,520,915

UNITED STATES PATENT OFFICE.

HARVEY P. SLEEPER, OF WILKINSBURG, PENNSYLVANIA, ASSIGNOR TO WESTINGHOUSE ELECTRIC & MANUFACTURING COMPANY, A CORPORATION OF PENNSYLVANIA.

TEMPERATURE INDICATOR.

Application filed November 30, 1920. Serial No. 427,310.

*To all whom it may concern:*

Be it known that I, HARVEY P. SLEEPER, a citizen of the United States, and a resident of Wilkinsburg, in the county of Allegheny and State of Pennsylvania, have invented a new and useful Improvement in Temperature Indicators, of which the following is a specification.

My invention relates to temperature indicators and particularly to temperature indicators for transformers.

One object of my invention is to provide means for indicating the occurrence of a predetermined temperature in a pole-mounted transformer.

Another object of my invention is to provide such means that may be readily visible from the street below the transformer.

Another object of my invention is to provide a device, of the above indicated character, that may be removably threaded into the oil drain of a transformer tank.

Another object of my invention is to provide a device, of the above indicated character, that may be easily reset.

A still further object of my invention is to provide a temperature indicator, of the above indicated character, that shall be simple and economical in its construction, and reliable in its operation.

In practicing my invention, I provide a thermal-responsive device, such as a bimetallic member, that shall be subjected to the temperature of the heat-storage device, the temperature of which is to be indicated, and a movable indicating member that shall be moved to a position at which it may be visible when the bimetallic member attains a predetermined temperature.

In the accompanying drawings, Fig. 1 is a side view, partially in elevation and partially in section, of an indicator embodying my invention;

Figure 1:
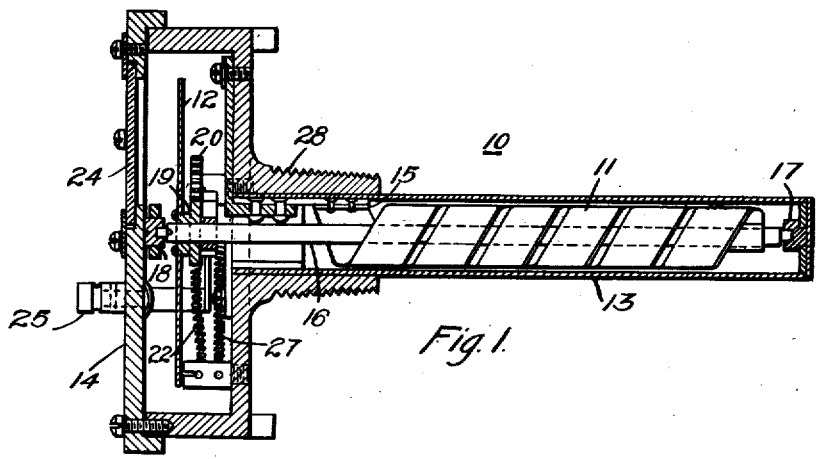
Figure 2:
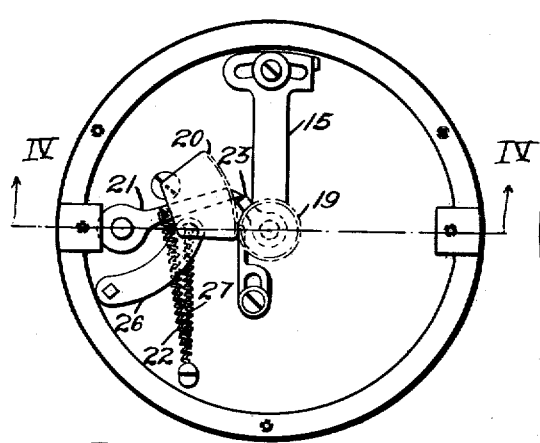
Fig. 2 is a front view of the indicator illustrated in Fig. 1, with the cover and the movable indicating member removed.
Figure 3:
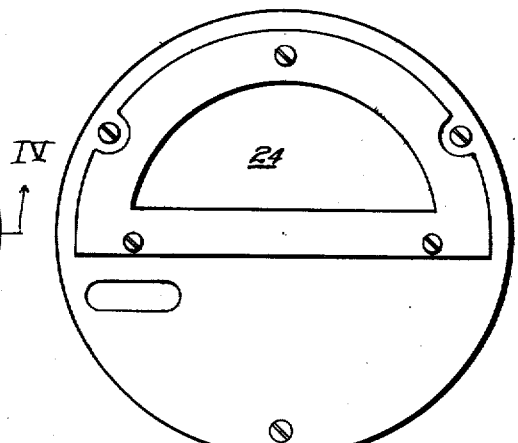
Fig. 3 is a front elevational view of the cover.
Figure 4:
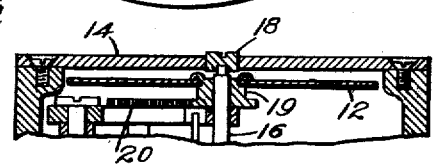
Fig. 4 is a sectional view taken on the line IV—IV of Fig. 2.
Figure 5:
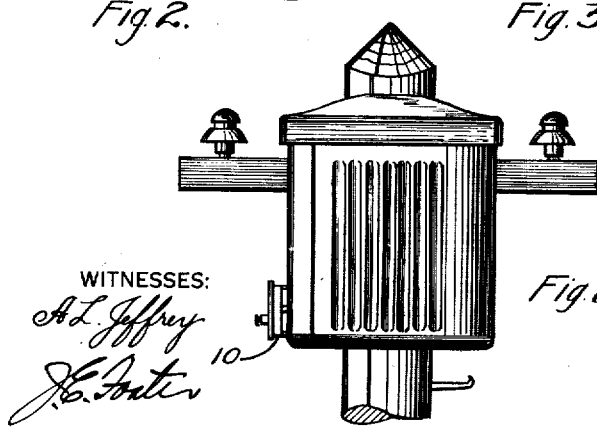
Fig. 5 is an elevational view, illustrating the disposition of the indicator on a pole-mounted transformer.

Referring to the accompanying drawings, a temperature indicator 10 comprises a bimetallic member 11 and a movable disc member 12 that is controlled thereby to indicate the development of a predetermined temperature in the member 11. The member 11 is disposed in a tubular casing 13, and the member 12 is disposed in a cylindrical casing 14 that is disposed at one end of, and supported on, the casing 13.

One end of the bimetallic member 11 is secured to an adjustable support 15 and its other end is secured to a shaft 16 that is supported between two bearings 17 and 18 that are disposed in the two casings 13 and 14, respectively.

The disc member 12 is disposed on a geared sleeve member 19 that is axially mounted on the shaft 16. The geared member 19 is engaged by a geared segment 20 that is supported on, and actuated by, a pivoted member 21. The pivoted member 21 is normally maintained in an inactive position by a latch member 23, that is secured to the shaft 16, in which position the spring 22 is maintained in tension.

When the bimetallic member attains a predetermined temperature, it is so twisted as to move the latch 23 to permit the spring 22 to actuate the pivoted member 21. The consequent movement of the pivoted member 21 and the geared segment 20 turns the member 12 about the shaft 16.

The casing 14 for the member 12 is provided with an opening or window 24 through which the member 12 may be observed. The portion of the disc member that may be normally observed, while the bimetallic element is unheated, is preferably black. The lower portion of the disc member, which is moved into vision when the indicator is operated, is preferably white.

The temperature at which the bimetallic element shall operate the indicator may be predetermined by adjusting the member 15, to which one end of said element is attached.

After the indicator has been operated, it may be reset by a movable knob 25 which is adapted to actuate a pivoted member 26, of arc shape, against the pivoted member 21 on which the geared segment 20 is disposed. When the pivoted member 21 is lifted past the latch 23, it is relatched and maintained in that position until the bimetallic member again releases that member to again operate the indicator. A spring 27 returns the pivoted member 26 to its initial position to remove it from the path of movement of the member 21.

The casing 14 is provided with a threaded portion 28 that serves to support the indicator in a fluid-containing receptacle, such as a transformer tank.

Since transformer tanks are provided with oil drains having removable plugs, the threaded opening, that is used as a drain, may be employed as the opening through which the indicator may be inserted into the oil. The employment of the oil drain of the transformer tank permits the indicator to be used with transformers as installed without costly changes of tanks or other apparatus.

Since the temperature of the oil at the bottom of the transformer tank bears a predetermined ratio to the temperature of the oil at the top, the indicator may be adjusted to operate at the hottest temperature of the transformer.

Although the indicator is shown in connection with a pole-mounted transformer, it is obvious that it may also be employed with other heat-storage devices to indicate the development of a predetermined temperature therein.

I do not limit the indicator embodying my invention to the specific structure that is illustrated, since various modifications may be made therein within the spirit and scope of the invention, as set forth in the appended claims.

I claim as my invention:

1. A temperature indicator comprising a thermal element, a pivoted member held in inactive position thereby under predetermined temperature conditions and released when the thermal element attains a predetermined temperature, a movable semaphore normally in non-indicating position and actuated to indicating position when the pivoted member is released and means for returning the pivoted member to its inactive position and permitting the thermal element to reengage the pivoted member.

2. A temperature indicator comprising a thermal element, a latch member controlled thereby, a semaphore movable to two predetermined positions, and means co-operating with the latch to preclude movement of the semaphore until a predetermined temperature is attained by the thermal element and then actuating the semaphore, said means comprising a geared wheel secured to the semaphore and a co-operating geared portion adapted to actuate the wheel when said portion is released from a biased position by the latch member.

3. A temperature indicator comprising a bimetallic element, a shaft controlled thereby, a lever secured to the shaft and movable therewith, a semaphore disposed on the shaft and relatively movable with respect thereto, a gear wheel secured to the semaphore to control the movement thereof, and a normally biased segmental gear for controlling such movement of the semaphore, the lever on the shaft serving to restrain the segmental gear in a biased position until the bimetallic element attains a predetermined temperature.

4. A temperature indicator comprising a thermal element, a shaft controlled thereby, a latch member controlled by the shaft, a movable semaphore disposed on the shaft and means controlled by the latch member to effect movement of the semaphore only when the thermal element attains a predetermined temperature.

5. A temperature indicator comprising a thermal element, a semaphore normally in non-indicating position and actuated to indicating position when the thermal element attains a predetermined temperature, an actuating means for the semaphore comprising a pivoted member and an operating member controlled by the pivoted member to actuate the semaphore, means controlled by the thermal element for releasing the pivoted member when the thermal element attains the predetermined temperature and means for resetting the pivoted member in its biased position.

6. In a temperature indicator, the combination with a thermal element and a movable indicating member, of a toothed member for actuating the indicating member, a normally biased toothed member for actuating the toothed actuating member and means for releasing the biased member at a predetermined temperature.

7. In a temperature indicator, the combination with a thermal element and a movable indicating member, of a toothed member for actuating the indicating member, a second toothed member for actuating the first toothed member, means for restraining the second toothed member until the thermal element attains a predetermined temperature and means for actuating the second toothed member upon its release by the restraining means.

8. A temperature indicator comprising a bimetallic member and a casing therefor adapted to be inserted into a heat-storage device, a movable member and a casing therefor, the chambers of both casings communicating to permit the bimetallic member to control the movable member, means normally restraining the movable member in one position, means for actuating that member to another position, means controlled by the bimetallic member for rendering the restraining means inoperative and means for predetermining when the restraining means shall be rendered inoperative.

9. A temperature indicator comprising a spiral bimetallic member, a casing therefor adapted to be inserted into a device in which the development of a predetermined temperature is to be indicated, a movable member, a casing therefor supported on the first-mentioned casing, a shaft supported between the two casings and having the movable member supported thereon, means for turning the movable member on the shaft, means for rendering the turning means inoperative until the bimetallic member is heated to a predetermined temperature, adjustable means for predetermining the temperature at which the indicator shall operate and means for resetting the indicator.

In testimony whereof, I have hereunto subscribed my name this 18th day of November, 1920.

HARVEY P. SLEEPER.

Certificate of Correction.

It is hereby certified that in Letters Patent No. 1,520,915, granted December 30, 1924, upon the application of Harvey P. Sleeper, of Wilkinsburg, Pennsylvania, for an improvement in "Temperature Indicators," errors appear in the printed specification requiring correction as follows: Page 2, lines 67 and 73, for the word "lever" read *latch;* and that the said Letters Patent should be read with these corrections therein that the same may conform to the record of the case in the Patent Office.

Signed and sealed this 10th day of March, A. D. 1925.

[SEAL.]

KARL FENNING,
*Acting Commissioner of Patents.*